UNITED STATES PATENT OFFICE.

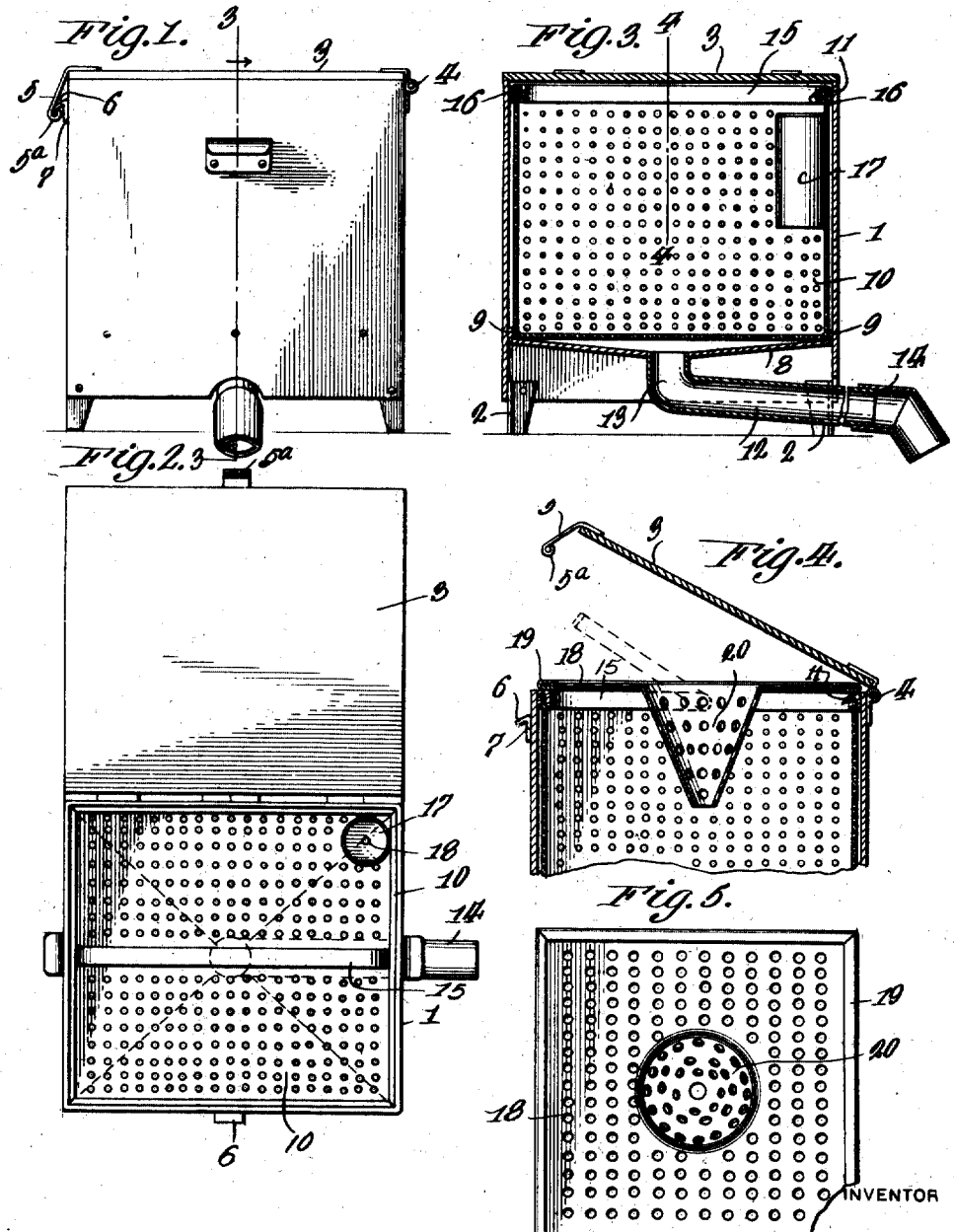

JAMES W. SHEPPERD, OF LOS ANGELES, CALIFORNIA.

GARBAGE-CONTAINER.

1,227,964.　　　　Specification of Letters Patent.　　Patented May 29, 1917.

Application filed January 10, 1917.　Serial No. 141,647.

*To all whom it may concern:*

Be it known that I, JAMES W. SHEPPERD, a citizen of the United States, residing at Los Angeles, in the county of Los Angeles and State of California, have invented certain new and useful Improvements in Garbage-Containers, of which the following is a specification.

This invention relates to garbage containers, and more particularly to a container for use in connection with a sink for receiving small particles of food, coffee grounds, and the like, to prevent stoppage of the drain pipe of the sink.

One of the main objects of the invention is to provide a receptacle to be placed adjacent a sink for receiving small particles of food, coffee grounds, and the like, which are often emptied into the sink, thus preventing stoppage of the drain pipe of the sink by these materials. A further object is to provide a receptacle so constructed as to insure proper draining and quick drying of small food particles and the like placed in the same thus preventing fermentation and rendering it an odorless receptacle. A still further object is to provide a receptacle having an outer casing provided with a drain pipe and an inner receptacle or container of foraminous construction mounted in spaced relation to the casing so as to permit free circulation of air through and about the inner receptacle thus insuring quick drying of the contents of the same. A still further object is to provide a cover for the inner receptacle having a downwardly directed conical member or funnel whereby this cover is adapted to coöperate with the receptacle to form a trap for catching flies and other insects. Further objects will appear from the detail description.

In the drawings:—

Figure 1 is a side view of a container constructed in accordance with my invention.

Fig. 2 is a top plan view of the same with the cover of the outer casing raised.

Fig. 3 is a section on line 3—3 of Fig. 1,

Fig. 4 is a section on line 4—4 of Fig. 3, showing the cover for the inner receptacle in place, Fig. 5 is a top plan view of the cover for the inner receptacle.

The outer casing 1 is of sheet metal construction and of rectangular cross section, being provided at each corner with a supporting leg 2 secured thereto. A cover 3 is hingedly secured to the upper edge of one wall of casing 1, as at 4. This cover is of such size as to fit snugly over the top of the casing when in lowered position so as to effect an approximately air tight closure therewith. A resilient sheet metal strip 5 is secured to the front of cover 3, at the center thereof, and is turned or rolled at its lower end to provide a tubular member 5ª. This tubular member is adapted to engage under the upper arm 6 of a securing plate 7 which is secured to the front of the casing, arm 6 being disposed at an acute angle to the body of the plate. By this means, the resilient strip 5 and plate 7 coöperate to hold the cover 3 tightly in closed position.

A sheet metal partition or bottom 8 is secured in casing 1 remote from the lower edge thereof. This bottom is of approximately flattened pyramidal shape, with its apex directed downwardly, so that the bottom inclines inwardly and downwardly toward its center from its periphery. Bottom 8 is provided with an integral upwardly directed peripheral flange 9 which is secured to the inner face of the walls of casing 1. This flange 9 acts to secure the bottom tightly within the casing, and also forms a receiving frame for an inner receptacle 10 which corresponds in shape to, but is somewhat smaller than, casing 1. Receptacle 10 is of perforated or foraminous construction, and is provided at its upper edge with a peripheral reinforcing U-strip 11 secured thereto. The lower peripheral edge of receptacle 10 rests on the bottom 8 adjacent flange 9, the receptacle being thus supported by the bottom, but in spaced relation thereto for practically the entire area of the bottom. Also, the side walls of receptacle 10 are maintained in spaced relation to the inner faces of the side walls of casing 1 by means of flange 9. The bottom 8 and flange 9 coöperate in this manner to maintain receptacle 10 in proper position within the casing and in spaced relation to the bottom and side walls thereof thus providing means for permitting free circulation of air through and about the receptacle.

A downwardly and outwardly inclined drain pipe 12 communicates with the interior of casing 1 by means of an integral elbow 13 which is secured to the bottom 8 at the center or apex thereof. An elbow 14 is fitted snugly on the outer end of pipe 12 and may be turned so that, when the container is mounted on a draining board or the like, closely adjacent a sink, elbow 14 will discharge into the sink. In using my container, it is mounted in any suitable position adjacent a sink so as to discharge into the same. The coffee grounds, tea leaves, and other waste which commonly accumulate in a sink are poured directly into the receptacle 10. All of the moisture drains off of these materials through the receptacle on to the bottom 8 and thence through the drain pipe 12. The drain pipe 12 also provides means whereby air can readily enter the bottom of casing 1 beneath receptacle 10 flowing freely through and about the same thus quickly drying the contents of the receptacle which may then be emptied into the usual garbage pail. By doing this, fermentation which commonly takes place where these materials are placed in a garbage pail without being previously dried, is prevented.

For convenience in handling, receptacle 10 is provided with a U-shaped bail or handle 15 each arm of which is pivotally secured to the U-strip 11, adjacent its inner end, at 16. The pivots for securing the handle 15 to the reinforcing strip 11 are in axial alinement, their common axis coinciding with the central line of receptacle 10. Also, the arms of handle 15 are of such length that, when the handle is turned downward into a horizontal position, it will fit snugly within one half of the frame formed by the U-strip 11 thus preventing interference by the handle with the pouring of materials into the receptacle. When it is desired to remove the receptacle from casing 1, this may be quickly and easily accomplished by turning the handle 15 about its pivotal axis upward through an arc of 90° into vertical position, as shown in Fig. 2 of the drawings.

The receptacle 10 is further provided at one corner and near the upper edge thereof, with a cylindrical container 17. This container is provided with a restricted opening 18 through the bottom thereof, and is adapted to contain a suitable disinfectant and deodorizer. This disinfectant will drip into the receptacle 10 slowly so as to thoroughly disinfect and deodorize the same, thus entirely eliminating any possibility of fermentation such as might otherwise occur under certain conditions such as when the device is used in excessively hot weather, or under similar conditions.

In order to insure quick drying of the contents of receptacle 10 it is desirable that the cover or top 3 of casing 1 be lifted into raised or open position. With the top 3 in this position it is necessary to provide a suitable cover or closure member for receptacle 10. For this purpose I provide a rectangular cover plate 18 which is perforated similarly to receptacle 10 and is provided with the peripheral reinforcing U-strip 19. This cover 18 is of such size as to fit over the upper end of receptacle 10 with strip 19 resting upon strip 11 so as to effect a tight closure therewith. The cover 18 is provided with a central downwardly directed cone or funnel 20 open at its lower end. This cone is adapted to permit the entry of flies and similar insects into the receptacle 10, while preventing their exit, thus acting in the well known manner in conjunction with the receptacle to provide a trap for flies and other insects.

There may be slight changes made in the construction and arrangement of the different parts of my invention without departing from the field and scope of the same, and I intend to include all such variations, as fall within the scope of the appended claims, in this application in which a preferred form only of my invention is disclosed.

What I claim is:—

1. In containers, a casing having a downwardly directed approximately pyramidal bottom, the bottom of said casing having an upwardly extending peripheral flange secured to the inner face of the walls of the casing, a receptacle of foraminous construction mounted within said casing and fitting snugly in said flange so as to be supported by the bottom of the casing and held in spaced relation thereto and to the walls of the casing, and a drain pipe communicating with the interior of the casing at the apex of the bottom thereof.

2. In containers, a casing having a downwardly directed pyramidal bottom, the bottom of said casing having an upwardly extending peripheral flange secured to the inner faces of the walls of the casing, a receptacle of foraminous construction mounted within said casing and fitting snugly in said flange so as to be supported by the bottom of the casing and held in spaced relation thereto and to the walls of the casing, a drain pipe communicating with the interior of the casing at the center of the bottom thereof, and a cover hingedly mounted on the casing and adapted to effect an approximately air tight closure therewith.

3. In containers, a casing having a bottom inclined downwardly and inwardly from its periphery to its center, a drain pipe communicating with said casing at the center of the bottom thereof, a receptacle of foraminous construction removably mounted within the casing in spaced relation to the walls of the same, and a removable perforated cover for said receptacle.

4. In containers, a casing having a bottom inclined downwardly and inwardly from its periphery to its center, a drain pipe communicating with said casing at the center of the bottom thereof, a receptacle of foraminous construction removably mounted within the casing in spaced relation to the walls of the same, and a removable perforated cover for said receptacle, provided with a downwardly directed funnel member whereby said cover and receptacle are adapted to coöperate to provide an insect trap and to permit ventilation of the receptacle.

In testimony whereof I affix my signature in presence of two witnesses.

JAMES W. SHEPPERD.

Witnesses:
CAMPBELL McGAVEN,
EDW. W. MARTIN.